United States Patent
Komazaki et al.

(10) Patent No.: US 7,141,625 B2
(45) Date of Patent: Nov. 28, 2006

(54) WATER BASE RESIN COMPOSITION

(75) Inventors: Shigeru Komazaki, Osaka (JP); Norio Kosaka, Osaka (JP); Hiroyuki Itou, Osaka (JP); Teruki Kiyohara, Osaka (JP)

(73) Assignees: Nippon Paint Co., Ltd., Osaka (JP); Dainippon Ink and Chemicals, Inc., Tokyo (JP)

( * ) Notice: Subject to any disclaimer, the term of this patent is extended or adjusted under 35 U.S.C. 154(b) by 57 days.

(21) Appl. No.: 10/489,308

(22) PCT Filed: Jun. 6, 2003

(86) PCT No.: PCT/JP03/07209

§ 371 (c)(1),
(2), (4) Date: Mar. 17, 2004

(87) PCT Pub. No.: WO03/106560

PCT Pub. Date: Dec. 24, 2003

(65) Prior Publication Data

US 2004/0242756 A1    Dec. 2, 2004

(30) Foreign Application Priority Data

Jun. 13, 2002 (JP) .............................. 2002-172679

(51) Int. Cl.
*C08L 67/06* (2006.01)
*C08L 67/00* (2006.01)

(52) U.S. Cl. ....................... 524/539; 524/501

(58) Field of Classification Search ..................... None
See application file for complete search history.

(56) References Cited

U.S. PATENT DOCUMENTS

| 2,915,487 A | 12/1959 | Shelley et al. |
| 4,990,593 A * | 2/1991 | Blount ..................... 528/272 |

FOREIGN PATENT DOCUMENTS

| EP | 0 484 356 | 6/1994 |
| JP | 5-287184 | 11/1993 |
| JP | 9-111184 | 4/1997 |
| JP | 11-76937 | 3/1999 |
| JP | 2000-44870 | 2/2000 |

OTHER PUBLICATIONS

Supplementary European Search Report for corresponding patent application No. 03760138 dated Sep. 12, 2005.

* cited by examiner

*Primary Examiner*—Tae H. Yoon
*Assistant Examiner*—Edward Cain
(74) *Attorney, Agent, or Firm*—Armstrong, Kratz, Quintos, Hanson & Brooks, LLP

(57) ABSTRACT

The present invention provides an aqueous resin composition that can be utilized in a wide variety of fields including paints for vehicles, paints for cans, paints for the outer facings of buildings, adhesives, inks, impregnating agents for fibers and paper, and sealing agents and the like, wherein the aqueous resin composition comprises a polyester resin (A) having an acid value from 10 to 50 and a hydroxyl value from 20 to 150, a vinyl modified polyester resin (B) having an acid value from 20 to 100 and a hydroxyl value from 20 to 150, and a curing agent (C).

4 Claims, No Drawings

WATER BASE RESIN COMPOSITION

BACKGROUND OF THE INVENTION

1. Field of the Invention

The present invention relates to an aqueous resin composition that can be utilized in a wide variety of fields including paints for vehicles, paints for cans, paints for the outer facings of buildings, adhesives, inks, impregnating agents for fibers and paper, and sealing agents and the like.

This application is the U.S. National Stage of International Application No. PCT/JP03/07209, filed on Jun. 6, 2003, the content of which is incorporated herein by reference.

Priority is claimed on Japanese Patent Application No. 2002-172679, filed Jun. 13, 2002, the content of which is incorporated herein by reference.

2. Description of Related Art

In recent years, environmental protection measures have required reductions in the volatile matter such as solvents that is discharged from paints, and the substitution of solvent based paints with water based paints is occurring in most fields.

For example, in the vehicle paint application field, large quantities of solvent based paints are used, and reducing the quantity of organic solvents discharged from these paints is now a primary concern, and the replacement of solvents based paints with water based paints is being investigated for paints used in all of the paint application processes, including priming, intermediate coats, and top coats.

Of the above types of paint, paints used in the intermediate coating of vehicles require high performance characteristics including resistance to chipping (chipping: paint film damage caused by small stones and the like flying off the road and striking the paint film), good adhesion to paint films such as the priming coating, good storage stability (pigment dispersibility), solvent resistance, and a favorable external appearance, and as a result, resin compositions comprising an organic solvent based polyester resin and an amino resin curing agent as the primary components have been used conventionally.

In recent years, aqueous coatings have started to be used in some vehicle intermediate coating materials, although an aqueous paint for use as a vehicle intermediate coating that is able to provide a high level of performance for all of the above required characteristics is still to be developed.

For example, aqueous intermediate coating materials comprising a polyester resin, a curing agent, and an amine salt of an organic sulfonic acid have been reported (for example, patent reference 1: Japanese Unexamined Patent Application, First Publication No. Hei 11-76937), and the disclosed technique enables a reduction in the quantity of organic solvent discharged during the vehicle paint application process. However, these aqueous intermediate coating materials display inadequate pigment dispersibility, and problems arise during storage, including coagulation or precipitation of the pigment.

Known techniques for resolving problems associated with the storage stability of the paint, arising from factors such as coagulation or precipitation of the pigment, or separation and precipitation of the resin, typically involve improving the pigment dispersibility using a pigment dispersing agent such as a surfactant or the like. However, in order to achieve the desired effect using this technique, a significant quantity of the pigment dispersing agent must be used, and because this pigment dispersing agent remains in the final paint film, it has a deleterious effect on the physical properties of the paint film such as the water resistance and the like, which presents a considerable practical problem.

Furthermore, it has also been reported that a paint produced using a pigment and a water dispersible alkyd resin composition, in which a hydrophobic alkyd resin having an acid value of no more than 5 and a hydroxyl value of 1 to 50, and a hydrophilic alkyd resin having an acid value of 10 to 20 and a hydroxyl value of no more than 5 are bonded together chemically, displays minimal variation in viscosity over time, and offers excellent storage stability (for example, patent reference 2: Japanese Unexamined Patent Application, First Publication No. Hei 5-287184). However, these water dispersible alkyd resin compositions display a structural characteristic wherein the surface of the dispersed particles within the aqueous medium are coated with the hydrophilic alkyd resin having a hydroxyl value of no more than 5, and the hydrophobic alkyd resin having a hydroxyl value of 1 to 50 exists internally, inside the particles, in other words, a structure in which hydroxyl groups are localized inside the particles, and consequently the curability of the composition when an amino resin or the like is used as the curing agent is poor, and the physical characteristics of the paint film, such as the solvent resistance, tend to be inferior.

Furthermore, it has also been reported that an aqueous resin composition comprising an aqueous alkyd resin produced by condensing a specific vinylated fatty acid with a polyol compound, and then performing a neutralization with a basic compound, displays excellent resin stability and paint stability, and also offers excellent overall storage stability (for example, patent reference 3: Japanese Unexamined Patent Application, First Publication No. Hei 9-111184). However, if a water based paint that utilizes this type of aqueous resin composition is used as the intermediate coating material for a vehicle, although the storage stability of the paint is excellent, the chipping resistance of the produced paint film is unsatisfactory.

As described above, substituting conventional solvent based paints with water based paints, while retaining a good balance between the typically required characteristics for a vehicle intermediate coating material such as chipping resistance, and ensuring excellent pigment dispersibility and storage stability is extremely difficult, and at present no such water based paint is available, although the need for a water based paint capable of satisfying the above required characteristics to a high level is growing rapidly stronger in the marketplace.

SUMMARY OF THE INVENTION

An object of the present invention is to provide an aqueous paint that is able to maintain the typically required characteristics for a vehicle intermediate coating material, such as chipping resistance, while also providing excellent pigment dispersibility and storage stability.

As a result of investigations, the inventors of the present invention were faced with the problem that although aqueous paints using an aqueous resin composition comprising, as primary components, a polyester resin that utilizes either an alicyclic acid or an aliphatic acid, and a curing agent display excellent chipping resistance of the produced paint film, viscosity variation of the aqueous resin composition and the aqueous paint is large, and the paints are also prone to separation and precipitation of the resin. Furthermore, they also observed that in those cases in which a polyester that utilizes an aromatic acid is used, although the viscosity variation problem of the aqueous resin composition improves, the chipping resistance deteriorates.

As a result of further investigations aimed at resolving these problems, the inventors discovered that, against predictions, an aqueous resin composition comprising, as the primary components, a polyester resin having a specific acid value and hydroxyl value, which uses essentially only an alicyclic acid and an aromatic acid, and uses either no aliphatic acid or an extremely reduced quantity, and a curing agent displayed a further improvement in viscosity variation over the case in which only an aromatic acid is used, and furthermore also offered excellent storage stability with no problems of resin separation or precipitation. Furthermore, the chipping resistance of a paint film obtained from an aqueous paint produced using such an aqueous resin composition was also extremely good.

However, an aqueous paint produced using such an aqueous resin composition required a slight improvement in pigment dispersibility, as on occasion the pigment could coagulate or precipitate on storage over time.

As a result of further intensive investigations, the inventors discovered that by combining the aforementioned polyester resin that uses essentially only an alicyclic acid and an aromatic acid, with a vinyl modified polyester resin having a specific acid value and hydroxyl value, and containing an aliphatic acid chain having a bonded vinyl polymer section comprising a specific quantity of a structural unit derived from a carboxyl group containing monomer, and a curing agent, an aqueous resin composition with excellent storage stability was produced, and furthermore an aqueous paint using such a composition offered excellent stability with no precipitation of the pigment, and moreover, the chipping resistance of the produced paint film was also excellent, and they were hence able to complete the present invention.

In other words, the present invention provides an aqueous resin composition comprising a polyester resin (A) having an acid value within a range from 10 to 50 and a hydroxyl value within a range from 20 to 150, a vinyl modified polyester resin (B) having an acid value within a range from 20 to 100 and a hydroxyl value within a range from 20 to 150, and a curing agent (C), wherein the polyester resin (A) comprises structural units derived from an aromatic acid and from an alicyclic acid, and the combined total of those structural units derived from the aromatic acid and the alicyclic acid accounts for at least 70 mol % of all the structural units derived from polybasic acids in the polyester resin (A), and the vinyl modified polyester resin (B) comprises an aliphatic acid chain having a bonded vinyl polymer section, in which from 15 to 45% by weight of the vinyl modified polyester resin (B) is the vinyl polymer section, and from 10 to 50% by weight of the vinyl polymer section is structural units derived from an α,β-ethylene based unsaturated monomer having a carboxyl group.

The vinyl modified polyester resin (B) can be produced by condensing a vinyl modified fatty acid (D) having a vinyl polymer section comprising a carboxyl group and an aryl group, and a polyester resin (E) containing hydroxyl groups. Furthermore, the molar ratio in the aforementioned polyester resin (A), between the structural units derived from an aromatic acid, and the structural units derived from an alicyclic acid, is preferably within a range from 20/80 to 50/50.

In addition, the present invention also provides an aqueous paint comprising an aforementioned aqueous resin composition.

According to the present invention, an aqueous paint with excellent storage stability, which is capable of forming a paint film with excellent chipping resistance and external appearance can be produced.

DETAILED DESCRIPTION OF THE INVENTION

As follows is a more specific description of the present invention.

An aqueous resin composition of the present invention comprises a polyester resin (A) having an acid value within a range from 10 to 50 and a hydroxyl value within a range from 20 to 150, a vinyl modified polyester resin (B) having an acid value within a range from 20 to 100 and a hydroxyl value within a range from 20 to 150, and a curing agent (C), wherein these components are dispersed or dissolved in an aqueous medium.

The polyester resin (A) used in the present invention can be produced by an esterification reaction using a polybasic acid and a polyalcohol as the principal reactants. The polyester resin (A) has an acid value within a range from 10 to 50 and a hydroxyl value within a range from 20 to 150.

In addition, the polyester resin (A) comprises structural units derived from an aromatic acid and from an alicyclic acid as the polybasic acid, and the combined total of those structural units derived from the aromatic acid and the alicyclic acid accounts for at least 70 mol %, and preferably at least 90 mol %, and even more preferably 100 mol %, of all the structural units derived from polybasic acids in the polyester resin (A). By ensuring a value within the above range, an aqueous resin composition capable of providing an aqueous paint with both excellent chipping resistance and excellent storage stability can be obtained.

In the polyester resin (A), the molar ratio between those structural units derived from the aromatic acid, and those structural units derived from the alicyclic acid is preferably within a range from 20/80 to 70/30, and even more preferably from 20/80 to 50/50. By ensuring a ratio within this range, an aqueous paint with excellent pigment dispersibility and excellent storage stability can be obtained.

Examples of aromatic acids that can be used during the production of the polyester resin (A) include various aromatic acids, including phthalic acid (anhydride), isophthalic acid, terephthalic acid, p-tert-butylbenzoic acid, trimellitic acid (anhydride), pyromellitic acid (anhydride), tetrachlorophthalic acid (anhydride), and 5-sodium sulfodimethyl isophthalate.

Furthermore, examples of the alicyclic acid include a variety of alicyclic polycarboxylic acids such as 1,1-cyclohexanedicarboxylic acid, hexahydrophthalic acid (anhydride), 1,3-cyclohexanedicarboxylic acid, 1,4-cyclohexanedicarboxylic acid, tetrahydrophthalic acid (anhydride), methylhexahydrophthalic acid (anhydride), Het acid (anhydride), 5-norbornene-2,3-dicarboxylic acid (anhydride) (HIMIC acid; registered trademark of Hitachi Chemical Co., Ltd.), hydrogenated trimellitic acid (anhydride), and endo-methylenetetrahydrophthalic acid (anhydride); as well as a variety of alicyclic monocarboxylic acids such as 4-tert-butylcyclohexane monocarboxylic acid and hexahydrobenzoic acid.

Furthermore, during production of the polyester resin (A), in addition to the aromatic and alicyclic polybasic acids described above, known aliphatic acids such as adipic acid, azelaic acid, sebacic acid, maleic acid (anhydride), fumaric acid, itaconic acid, octenoic acid, and isononanoic acid may also be added.

Furthermore, during production of the polyester resin (A), in addition to the above polybasic acids, oils or fatty acids obtained by hydrolysis of those oils may also be used and suitable examples include coconut oil, hydrogenated coconut oil, rice bran oil, tall oil, soybean oil, castor oil, dehydrated castor oil, as well as the fatty acids obtained by hydrolysis of these oils. Furthermore, in addition to the above oils, "CARDURA E" (a glycidyl ester of a branched aliphatic monocarboxylic acid, manufactured by Shell International B.V.) can also be used.

As described above, aliphatic acids, oils, and fatty acids obtained by hydrolysis of such oils, can be used in addition to the aromatic acid and the alicyclic acid described above, although from the viewpoint of achieving the objects of the present invention, including superior storage stability for the aqueous paint, the quantities of such additional components is preferably kept as small as possible.

Examples of the polyalcohols that can be used in the production of the polyester resin (A) include ethylene glycol, propylene glycol, 1,3-butylene glycol, 1,4-butylene glycol, 1,6-hexamethylene glycol, diethylene glycol, dipropylene glycol, neopentyl glycol, triethylene glycol, cyclohexanedimethanol, hydrogenated bisphenol A, glycerin, trimethylolethane, trimethylolpropane, pentaerythritol, dipentaerythritol, and sorbitol.

The structure of the polyester resin (A) produced using the various polybasic acids and polyalcohols described above may be either a linear structure or a branched structure.

There are no particular restrictions on the method used for producing the polyester resin (A), provided the method effects an esterification of the polybasic acid and the polyalcohol, and either molten methods or solvent methods can be used.

A molten method refers to a method in which the polybasic acid and the polyalcohol are heated to 150 to 250° C. in a nitrogen atmosphere, and an esterification is conducted while the produced water is sequentially removed, thereby producing a solid polyester resin (A) having a predetermined hydroxyl value and acid value.

Furthermore, a solvent method refers to a method in which the polybasic acid and the polyalcohol are heated in a solvent such as xylene to effect an esterification, and the solvent is then removed to yield a solid polyester resin (A).

The solvent may also utilize a hydrophilic organic solvent, as described below. In such cases, by adding a basic compound described below to neutralize the reaction mixture following the esterification reaction, and then dispersing or dissolving this neutralized mixture in water, an aqueous solution or an aqueous dispersion of the polyester resin (A) can be obtained.

Furthermore, during the aforementioned esterification reaction, a known catalyst can also be used to promote the reaction, and examples of such a catalyst include dibutyltin oxide, antimony trioxide, zinc acetate, manganese acetate, cobalt acetate, calcium acetate, lead acetate, tetrabutyl titanate, and tetraisopropyl titanate.

The acid value of the thus obtained polyester resin (A) is within a range from 10 to 50, and preferably from 15 to 40, and the hydroxyl value is within a range from 20 to 150, and preferably from 40 to 150. If this acid value is less than 10, then the conversion of the polyester resin (A) to an aqueous system is unsatisfactory, whereas if the hydroxyl value is less than 20, the curability of the product paint film is unsatisfactory. Furthermore, if the acid value exceeds 50 or the hydroxyl value exceeds 150, the water resistance and the durability of the product paint film deteriorate.

Furthermore, a urethane modified polyester resin can also be used as the polyester resin (A). Examples include products resulting from the polyaddition of a polyisocyanate such as tolylene diisocyanate, methylene bisphenylisocyanate, or a trimethylolpropane adduct of hexamethylene diisocyanate (TMP modified HDI), following synthesis of the aforementioned polyester resin (A).

Furthermore, the weight average molecular weight of the aforementioned polyester resin (A) is preferably within a range from 1000 to 20,000, and even more preferably from 1000 to 10,000. By using a polyester resin (A) having a weight average molecular weight that falls within this range, an aqueous paint with excellent curability that is capable of forming a paint film with excellent water resistance and smoothness can be obtained.

As follows is a description of a vinyl modified polyester resin (B) used in the present invention. The vinyl modified polyester resin (B) has an acid value within a range from 20 to 100 and a hydroxyl value within a range from 20 to 150, and comprises an aliphatic acid chain having a bonded vinyl polymer section, wherein from 15 to 45% by weight of the vinyl modified polyester resin (B) is the vinyl polymer section, and from 10 to 50% by weight of the vinyl polymer section is comprised of structural units derived from an $\alpha,\beta$-ethylene based unsaturated monomer having a carboxyl group.

The vinyl modified polyester resin (B) can be produced using a method in which a vinyl modified fatty acid having a vinyl polymer section, which is produced by a radical polymerization of an $\alpha,\beta$-ethylene based unsaturated monomer having a carboxyl group and another copolymerizable $\alpha,\beta$-ethylene based unsaturated monomer in the presence of an unsaturated fatty acid, and a polyester resin (E) having hydroxyl groups described below are subjected to a condensation.

Vinyl modified polyester resins (B) produced using a method in which a vinyl modified fatty acid (D) having a vinyl polymer section containing a carboxyl group and an aryl group, as described below (hereafter referred to as a vinyl modified fatty acid (D)), is used as the aforementioned vinyl modified fatty acid, and this vinyl modified fatty acid (D) and a polyester resin (E) containing hydroxyl groups are subjected to a condensation, are particularly preferred as they enable the provision of an aqueous resin composition and an aqueous paint with excellent storage stability.

The aforementioned vinyl modified fatty acid (D) can be produced by, for example, a radical polymerization of an $\alpha,\beta$-ethylene based unsaturated monomer having a carboxyl group, an $\alpha,\beta$-ethylene based unsaturated monomer having an aryl group, and another copolymerizable $\alpha,\beta$-ethylene based unsaturated monomer in the presence of an unsaturated fatty acid.

The carboxyl groups of the vinyl modified fatty acid (including the vinyl modified fatty acid (D); hereafter the term vinyl modified fatty acid also includes the subordinate concept of the vinyl modified fatty acid (D)) used in the production of the vinyl modified polyester resin (B) include both groups derived from unsaturated fatty acids, and groups derived from $\alpha,\beta$-ethylene based unsaturated monomers having carboxyl groups, and both these types of carboxyl groups can undergo a condensation reaction having the hydroxyl groups of the hydroxyl group containing polyester resin (E), although use of a vinyl modified polyester resin (B) obtained through a condensation reaction between carboxyl groups derived from an unsaturated fatty acid, and the hydroxyl groups of a hydroxyl group containing polyester resin (E) are preferred in terms of the storage stability of the aqueous resin composition and the aqueous paint.

Examples of unsaturated fatty acids that can be used in the production of the vinyl modified fatty acid include fatty acids derived from the various (semi) drying oils and non-drying oils such as tung oil, linseed oil, soybean oil, safflower oil, castor oil, dehydrated castor oil, rice bran oil, cotton seed oil, and coconut oil. These fatty acids can be used singularly, or in combinations of two or more different fatty acids.

The quantity used of the unsaturated fatty acid preferably accounts for 20 to 70% by weight, and even more preferably from 30 to 60% by weight, of the total quantity of raw materials used in the production of the vinyl modified fatty acid. By using a vinyl modified fatty acid produced using a quantity of unsaturated fatty acid within the above range, the dispersion stability of the vinyl modified polyester resin (B), the storage stability of an aqueous paint of the present invention, and the paint film characteristics such as the water resistance and the corrosion resistance of a paint film produced using an aqueous paint of the present invention, can all be improved.

Furthermore, examples of carboxyl group containing $\alpha,\beta$-ethylene based unsaturated monomers that can be used in the production of the vinyl modified fatty acid include $\alpha,\beta$-ethylene based unsaturated monocarboxylic acids such as acrylic acid, methacrylic acid, and crotonic acid, $\alpha,\beta$-ethylene based unsaturated dicarboxylic acids such as maleic acid, fumaric acid and itaconic acid, as well as acid anhydrides such as maleic anhydride and itaconic anhydride, and monoester compounds of these anhydrides, and using at least one of the above compounds is preferred, and from the viewpoint of ensuring favorable physical properties for the produced paint film, the use of methacrylic acid is particularly preferred.

The quantity used of $\alpha,\beta$-ethylene based unsaturated monomer containing this carboxyl group must be set so that from 10 to 50% by weight of the vinyl polymer section within the produced vinyl modified polyester resin (B) is formed from structural units derived from $\alpha,\beta$-ethylene based unsaturated monomer containing the carboxyl group. By ensuring a quantity within this range, the stability of the aqueous dispersion or aqueous solution of the vinyl modified polyester resin (B), and the stability of an aqueous resin composition of the present invention can both be improved, an aqueous paint according to the present invention with excellent storage stability can be produced, and a paint film that is resistant to whitening, even following drying, can be obtained.

Examples of $\alpha,\beta$-ethylene based unsaturated monomers having aryl groups that can be used in the production of the vinyl modified fatty acid (D) include styrene, and styrene derivatives having functional groups such as alkyl groups at any of the positions of the styrene aromatic ring. Specific examples of these styrene derivatives include tert-butylstyrene, $\alpha$-methylstyrene, and vinyltoluene.

There are no particular restrictions on the quantity used of the $\alpha,\beta$-ethylene based unsaturated monomer having an aryl group, although the quantity is preferably at least 20% by weight, and even more preferably from 30 to 70% by weight, relative to the combined quantity of all of the $\alpha,\beta$-ethylene based unsaturated monomers used in the polymerization of the vinyl polymer section containing a carboxyl group and an aryl group. By ensuring that the quantity of the $\alpha,\beta$-ethylene based unsaturated monomer having an aryl group falls within the above range, the stability of the aqueous dispersion or aqueous solution of the vinyl modified polyester resin (B) can be further improved, and an aqueous resin composition and an aqueous paint of the present invention with even more superior storage stability can be produced.

During the production of the vinyl modified fatty acid, other copolymerizable $\alpha,\beta$-ethylene based unsaturated monomers can also be used, in addition to the $\alpha,\beta$-ethylene based unsaturated monomer having a carboxyl group and the $\alpha,\beta$-ethylene based unsaturated monomer having an aryl group described above. These other copolymerizable $\alpha,\beta$-ethylene based unsaturated monomers are $\alpha,\beta$-ethylene based unsaturated monomers that differ from both the aforementioned $\alpha,\beta$-ethylene based unsaturated monomers having a carboxyl group and the aforementioned $\alpha,\beta$-ethylene based unsaturated monomers having an aryl group, and specific examples include alkyl esters of (meth)acrylic acid such as methyl (meth)acrylate, ethyl (meth)acrylate, n-butyl (meth)acrylate, isobutyl (meth)acrylate, t-butyl (meth)acrylate, 2-ethylhexyl (meth)acrylate, and cyclohexyl (meth)acrylate.

Furthermore, hydroxyalkyl esters of (meth)acrylic acid such as 2-hydroxyethyl (meth)acrylate and 2-hydroxypropyl (meth)acrylate can also be used as an aforementioned other copolymerizable $\alpha,\beta$-ethylene based unsaturated monomer, provided they are used within a range that enables the objects of the present invention to be achieved, and within a range which will not cause gelling in the condensation reaction between the vinyl modified fatty acid (D) and the polyester resin (E) having hydroxyl groups.

In addition, $\alpha,\beta$-ethylene based unsaturated monomers having a non-ionic surfactant action such as methoxypolyethylene glycol mono(meth)acrylate, polyethylene glycol mono(meth)acrylate and propylene glycol polyethylene glycol mono(meth)acrylate can also be used as an aforementioned other copolymerizable $\alpha,\beta$-ethylene based unsaturated monomer.

The vinyl modified fatty acid used in the production of the vinyl modified polyester resin (B) can be produced by solution polymerization or bulk polymerization or the like.

In a solution polymerization method, for example, $\alpha,\beta$-ethylene based unsaturated monomers such as the aforementioned $\alpha,\beta$-ethylene based unsaturated monomer having a carboxyl group, and an unsaturated fatty acid are either added in a dropwise manner, intermittently or continuously, or added in a single batch, to an organic solvent, in the presence of a polymerization initiator, under an atmosphere of an inert gas, and the reaction mixture is then maintained at a temperature of approximately 70 to 150° C. to yield the vinyl modified fatty acid.

The polymerization initiator may be added in advance to the organic solvent, as in the description above, or may also be added during the dropwise addition of the various $\alpha,\beta$-ethylene based unsaturated monomers and the unsaturated fatty acid.

Examples of organic solvents that can be used in this type of solution polymerization include aromatic solvents such as toluene and xylene, ketone based solvents such as methyl ethyl ketone and methyl isobutyl ketone, and ester based solvents such as ethyl acetate and butyl acetate.

The organic solvents that can be used in the solution polymerization should either be used in small quantities, or in those cases in which a solvent removal process is used, an alcohol based solvent such as isopropanol or n-butanol, or a glycol ether based solvent such as ethyl cellosolve or butyl cellosolve can be used in a quantity that does not impair the condensation reaction between the vinyl modified fatty acid and the polyester resin (E) having hydroxyl groups.

Furthermore, examples of polymerization initiators that can be used in a solution polymerization include organic peroxides such as t-butylperoxy benzoate, di-t-butyl peroxide, t-butylperoxy-2-ethylhexanoate, and benzoyl peroxide, and azo compounds such as 2,2'-azobisisobutyronitrile, and 2,2'-azobis-2-methylbutyronitrile, and the above organic peroxides are particularly preferred.

Furthermore, in the production of a vinyl modified fatty acid using a solution polymerization method, chain transfer agents can also be used if necessary, and examples of chain transfer agents include alkylmercaptans such as t-dodecylmercaptan, normal dodecylmercaptan and normal octylmercaptan, or α-methylstyrene dimers.

Furthermore, in a bulk polymerization method, α,β-ethylene based unsaturated monomers such as the aforementioned α,β-ethylene based unsaturated monomer having a carboxyl group, and an unsaturated fatty acid are added in a single batch, or added in a dropwise manner, intermittently or continuously, without the use of an organic solvent, and are then heated and mixed to yield the vinyl modified fatty acid.

Furthermore, during this process, by conducting the bulk polymerization of the α,β-ethylene based unsaturated monomers and the unsaturated fatty acid in the presence of a polyester resin (E) having hydroxyl groups such as those described below, a vinyl modified polyester resin (B) can be produced directly.

Next is a description of the polyester resin (E) having hydroxyl groups, which is subjected to a condensation reaction with the aforementioned vinyl modified fatty acid. The polyester resin (E) having hydroxyl groups refers to those materials produced by a condensation reaction using a polybasic acid and a polyalcohol as a primary reaction component that contain a hydroxyl group. Depending on the targeted application, this polyester resin (E) having hydroxyl groups may also have been subjected to urethane modification or silicone modification.

The polybasic acid used in the production of the polyester resin (E) having hydroxyl groups is preferably a compound having 2 to 4 carboxyl groups per one molecule, and suitable examples include phthalic acid, isophthalic acid, terephthalic acid, succinic acid, maleic acid, itaconic acid, fumaric acid, tetrahydrophthalic acid, hexahydrophthalic acid, methyltetrahydrophthalic acid, adipic acid, sebacic acid, azelaic acid, HIMIC acid, trimellitic acid, methylcyclohexenetricarboxylic acid, and pyromellitic acid, as well as the anhydrides of these acids.

Furthermore, the polyalcohol used in the production of the polyester resin (E) having hydroxyl groups is preferably a compound having 2 to 6 hydroxyl groups per one molecule, and examples include ethylene glycol, propylene glycol, neopentyl glycol, butanediol, pentanediol, 1,4-cyclohexanedimethanol, trimethylolethane, trimethylolpropane, glycerin, trisisocyanurate, and pentaerythritol.

Furthermore, during the production of the polyester resin (E) having hydroxyl groups, in addition to the above polybasic acid, animal based oils, plant based oils, fatty acids produced by hydrolysis of such oils, or "CARDURA E" (a glycidyl ester of a branched aliphatic monocarboxylic acid, manufactured by Shell International B.V.) can also be used if necessary, provided the objects of the present invention can still be achieved.

Examples of the aforementioned animal based oils, plant based oils, and fatty acids produced by hydrolysis of such oils include coconut oil, hydrogenated coconut oil, rice bran oil, tall oil, soybean oil, castor oil, dehydrated castor oil, as well as the fatty acids obtained by hydrolysis of these oils.

From the viewpoint of storage stability of the product aqueous paint, the quantity used of the above animal based oils, plant based oils, or fatty acids produced by hydrolysis of such oils is preferably no more than 50% by weight of the polyester resin (E) having hydroxyl groups.

Furthermore, the structure of the polyester resin (E) having hydroxyl groups may be either a linear structure or a branched structure.

The polyester resin (E) having hydroxyl groups can be produced by a condensation reaction using a polybasic acid and a polyalcohol as the primary reaction components, and the molten methods or solution methods described for the production of the polyester resin (A) can be applied, using conditions in which, for example, the polyalcohol is present in excess relative to the polybasic acid.

Furthermore, in a similar manner to that described above, the polyester resin (E) having hydroxyl groups may also use a urethane modified polyester produced by the polyaddition of a polyisocyanate such as tolylene diisocyanate, methylene bisphenylisocyanate, or in certain cases, a trimethylolpropane adduct of hexamethylene diisocyanate (TMP modified HDI), following synthesis of the polyester having hydroxyl groups.

The polyester resin (E) having hydroxyl groups preferably has a hydroxyl value within a range from 50 to 300, and even more preferably from 100 to 250. Provided the hydroxyl value falls within this range, the condensation reaction between the aforementioned vinyl modified fatty acid and the polyester resin (E) having hydroxyl groups proceeds smoothly, and a product paint film with excellent water resistance and durability can be ensured.

The vinyl modified polyester resin (B) used in the present invention can be produced by mixing, heating, and effecting a condensation reaction between the vinyl modified fatty acid and the polyester resin (E) having hydroxyl groups, which are preferably mixed in a ratio within a range from 20:80 to 70:30. During this process, an additional quantity of the polybasic acids listed as being suitable for use in the production of the polyester resin (E) having hydroxyl groups may also be added.

There are no particular restrictions on the temperature of the above condensation reaction, although temperatures within a range from 170 to 210° C. are preferred. From the viewpoint of the rate of reaction, the temperature is preferably adjusted in accordance with the variety of the α,β-ethylene based unsaturated monomer containing carboxyl group.

The condensation reaction occurs between the hydroxyl groups of the polyester resin (E) having hydroxyl groups, and the carboxyl groups of the vinyl modified fatty acid. The vinyl modified fatty acid contains both carboxyl groups derived from the unsaturated fatty acid and carboxyl groups derived from the vinyl polymer section, although of these, reacting the carboxyl groups derived from the unsaturated fatty acid with the hydroxyl groups of the polyester resin (E) having hydroxyl groups is preferred in terms of producing a superior level of water dispersibility or water solubility for the product vinyl modified polyester resin (B).

Cases in which the carboxyl groups derived from the vinyl polymer section are carboxyl groups derived from methacrylic acid are particularly preferred, as the reactivity of these carboxyl groups is significantly lower than the reactivity of the carboxyl groups derived from the unsaturated fatty acid, and consequently the carboxyl groups derived from the unsaturated fatty acid take part almost exclusively in the condensation reaction.

Furthermore, the vinyl modified polyester resin (B) can also be produced by a different method to that described above, under the presence of the polyester resin (E) having hydroxyl groups, adding a small quantity of an organic solvent if necessary, adding and mixing the monomers such as the aforementioned unsaturated fatty acid, and the α,β- ethylene based unsaturated monomer having a carboxyl group, and then raising the temperature to effect a condensation reaction.

Furthermore, the vinyl modified polyester resin (B) can also be produced by a method in which the polyester resin (E) having hydroxyl groups and the unsaturated fatty acid are subjected to a condensation reaction to form a polyester resin, and monomers such as the aforementioned α,β-ethylene based unsaturated monomer having a carboxyl group are then added and mixed to effect a polyaddition.

In addition, the vinyl modified polyester resin (B) can also be produced by subjecting the polyester resin (E) having hydrodxyl groups and the unsaturated fatty acid to a condensation reaction to form a polyester resin, and then effecting an addition reaction of a vinyl polymer with a carboxyl group to this polyester resin.

Thus the obtained vinyl modified polyester resin (B) preferably has an acid value within a range from 20 to 100, and even more preferably from 20 to 50, and most preferably from 20 to 40. Furthermore, the vinyl modified polyester resin (B) preferably has a hydroxyl value within a range from 20 to 150, and even more preferably from 40 to 150.

Provided the acid value falls within the above range, the vinyl modified polyester resin (B) can be adequately dispersed or dissolved in water, and the water resistance and the durability of the product paint film is good. Furthermore, provided the hydroxyl value falls within the above range, a paint film with excellent water resistance, durability and curability can be produced.

Furthermore, in a vinyl modified polyester resin (B) used in the present invention, from 15 to 45% by weight of the resin must be accounted for by the aforementioned vinyl polymer section. By ensuring that this proportion falls within this range, the stability of the aqueous dispersion or aqueous solution of the vinyl modified polyester resin (B) can be further improved, enabling an even more superior level of storage stability for an aqueous resin composition and aqueous paint of the present invention.

Furthermore, the weight average molecular weight of the vinyl modified polyester resin (B) is preferably within a range from 10,000 to 150,000, and even more preferably from 30,000 to 100,000.

Known methods can be used for dispersing or dissolving the polyester resin (A) and the vinyl modified polyester resin (B) used in the present invention in water, although of such known methods, phase inversion emulsification methods are ideal.

An example of a method of dispersing or dissolving the polyester resin (A) in water using a phase inversion emulsification method involves neutralizing the polyester resin (A) having a basic compound, and then adding the resin to water and stirring, to effect dispersion or dissolution in the water.

Specifically, a basic compound, and where necessary a quantity of a hydrophilic organic solvent, are added to and mixed with a solid polyester resin (A) obtained from an aforementioned molten method or solution method, thereby neutralizing either a portion of, or all of, the acid groups within the polyester resin (A), and water is then added and mixed to disperse or dissolve the polyester resin (A) in the water.

In such a case, there are no particular restrictions on the timing of the addition of the hydrophilic organic solvent and the basic compound to the polyester resin (A), and the hydrophilic organic solvent and the basic compound may be added separately, or a mixture of the hydrophilic organic solvent and the basic compound may be added at a suitable time.

In order to efficiently neutralize the acid groups of the polyester resin (A) and effect dispersion or dissolution in the water, a method in which the solid polyester resin (A) is first dissolved in the hydrophilic solvent, the basic compound is then added to neutralize either a portion of, or all of, the acid groups, and water is then added to disperse or dissolve the polyester resin (A) in water is preferred.

An example of a method of dispersing or dissolving the vinyl modified polyester resin (B) in water using a phase inversion emulsification method involves neutralizing the vinyl modified polyester resin (B) having a basic compound, and then adding the resin to water and stirring, to effect dispersion or dissolution in the water.

Specifically, a basic compound, and where necessary a quantity of a hydrophilic organic solvent, are added to and mixed with a vinyl modified polyester resin (B), thereby neutralizing either a portion of, or all of, the acid groups within the vinyl modified polyester resin (B), and water is then added to disperse or dissolve the polyester resin (B) in the water.

In such a case, there are no particular restrictions on the timing of the addition of the hydrophilic organic solvent and the basic compound to the vinyl modified polyester resin (B), and the hydrophilic organic solvent and the basic compound may be added separately, or a mixture of the hydrophilic organic solvent and the basic compound may be added at a suitable time.

In order to efficiently neutralize the acid groups of the vinyl modified polyester resin (B) and effect dispersion or dissolution in the water, a method in which the vinyl modified polyester resin (B) is first dissolved in the hydrophilic solvent, the basic compound is then added to neutralize either a portion of, or all of, the acid groups, and water is then added to disperse or dissolve the polyester resin (B) in water is preferred.

Furthermore a basic compound, and where necessary a quantity of a hydrophilic organic solvent can also be added to a mixture of a polyester resin (A), a vinyl modified polyester resin (B), and a curing agent (C) described below, and water then added to disperse or dissolve these components in water.

Examples of the hydrophilic solvent described above include ether alcohols such as monoether compounds of ethylene glycol, and methanol, ethanol, propanol or butanol; monoether compounds of propylene glycol, and methanol, ethanol, propanol or butanol; monoether compounds of diethylene glycol, and methanol, ethanol, propanol or butanol; monoether compounds of dipropylene glycol, and methanol, ethanol, propanol or butanol; as well as 1,3-butylene glycol-3-monomethyl ether (common name: 3-methoxybutanol), 3-methyl-3-methoxybutanol (common name: solfit), and ether esters such as methyl cellosolve acetate that display indefinite solubility in water at 20° C. The quantity used of the hydrophilic organic solvent can be set so as to ensure efficient neutralization of the acid groups of the polyester resin (A) and the vinyl modified polyester resin (B), although from the viewpoint of a low VOC, the quantity of the solvent is preferably kept small.

Furthermore, the basic compound used for neutralizing either a portion of, or all of, the acid groups within the polyester resin (A) or the vinyl modified polyester resin (B) can utilize typical known compounds, and suitable examples include the hydroxides of alkali metals or alkali earth metals such as sodium hydroxide, potassium hydroxide, lithium hydroxide, calcium hydroxide, and barium hydroxide; primary monoamines such as ammonia, ethylamine, propylamine, butylamine, benzylamine, monoethanolamine, neopentanolamine, 2-aminopropanol, and 3-aminopropanol; secondary monoamines such as diethylamine, diethanolamine, di-n- or iso-propanolamine, N-methylethanolamine, and N-ethylethanolamine; and tertiary monoamines such as dimethylethanolamine, trimethylamine, triethylamine, methyldiethanolamine, and dimethylaminoethanol; as well as polyamines such as diethylenetriamine, hydroxyethylaminoethylamine, and ethylaminoethylamine; and moreover, suitable combinations of basic compounds may also be used to adjust the hydrophilicity of the aforementioned polyester resin (A).

The quantity used of this basic compound is preferably within a range from 40 to 100 mol %, and even more preferably from 60 to 100 mol %, relative to the quantity of carboxyl groups within the polyester resin (A) or the vinyl modified polyester resin (B).

There are no particular restrictions on the curing agent (C) used in the present invention, provided the agent displays reactivity towards the hydroxyl groups of the polyester resin (A) and the vinyl modified polyester resin (B), and examples include amino resins and block isocyanates.

Specific examples of these amino resins include methylolated amino resins produced by the reaction of one or more materials such as melamine, urea and benzoguanamine, with formaldehyde, and methylolated amino resins containing imino group. Of these, resins particularly suited to forming aqueous formulations are preferred, and specific examples include resins in which either all, or a portion of, the methylol groups within the above amino resins have been etherified with a monovalent alcohol of 1 to 8 carbon atoms, such as butoxymethylmelamine resin, methoxymethylated melamine resin, and methoxy-butoxy mixed etherified methylmelamine resin.

Furthermore, examples of the aforementioned block isocyanates include block isocyanates produced by the blocking of an adduct of an organic diisocyanate compound and a polyalcohol, a low molecular weight polyester resin containing hydroxyl group, a low molecular weight alkyd resin containing hydroxyl group or water, and a polymer produced from the types of organic diisocyanate compounds described above (including isocyanurate type polyisocyanate compounds and uretodione compounds), using a known blocking agent such as an oxime, a phenol, an alcohol, or a diketone.

Examples of the aforementioned organic diisocyanate compounds include the various cyclic diisocyanates (including alicyclic diisocyanates) such as xylylene diisocyanate or isophorone diisocyanate, the various aromatic diisocyanates such as tolylene diisocyanate or 4,4-diphenylmethane diisocyanate, and the various aliphatic diisocyanates such as hexamethylene diisocyanate or trimethylhexamethylene diisocyanate.

Of the above compounds, the use of materials in which one terminal of the isocyanate group is modified with a polyoxyethylene glycol or the like, and the other terminal is blocked with an alkoxy group, or water dispersible block isocyanates in which one terminal is modified with a polyoxyalkylene compound comprising a group having an active hydrogen atom is preferred.

An aqueous resin composition of the present invention can be produced by mixing an aqueous dispersion or aqueous solution of an aforementioned polyester resin (A), an aqueous dispersion or aqueous solution of an aforementioned vinyl modified polyester resin (B), and a curing agent (C) using a known method.

Furthermore, the aqueous resin composition can also be produced by mixing the polyester resin (A), the vinyl modified polyester resin (B) and the curing agent (C), adding a hydrophilic organic solvent where necessary, adding and stirring a basic compound and/or an emulsifying agent, and then adding water to either disperse or dissolve the mixture.

The relative contents of the polyester resin (A), the vinyl modified polyester resin (B) and the curing agent (C) within the thus obtained aqueous resin composition preferably result in a weight ratio [polyester resin (A)+vinyl modified polyester resin (B)]/curing agent (C) that falls within a range from 50/50 to 90/10, and even more preferably from 60/40 to 85/15.

Furthermore, the weight ratio [polyester resin (A)/vinyl modified polyester resin (B)] is preferably within a range from 50/50 to 85/15. By adjusting the respective quantities to ensure ratios within the above ranges, an aqueous paint with excellent adhesion, curability and storage stability can be produced, and a paint film with superior chipping resistance and water resistance can also be achieved.

As follows is a description of an aqueous paint of the present invention.

An aqueous paint of the present invention can be produced by forming an aqueous resin composition according to the present invention as described above, adding curing catalysts, pigments, antifoaming agents, dispersants, surface regulating agents, color separation prevention agents, flow regulating agents, or other resins as required, and then mixing the components using a conventional apparatus. Particularly in those cases in which a pigment is used, the pigment must be mixed with either the aqueous resin composition or the resin components that form the aqueous resin composition, and then thoroughly dispersed using a conventional dispersing device.

The aforementioned curing catalysts are used to promote the curing of the aqueous resin composition or aqueous paint of the present invention, and examples include acid catalysts such as organic acids like paratoluenesulfonic acid, dodecylbenzenesulfonic acid, dinonylnaphthalenedisulfonic acid, amine block compounds produced from such acids, half esters of tetrachlorophthalic anhydride and a monovalent alcohol, and trichloroacetic acid; metal compounds such as tetraisopropyl titanate, dibutyltin laurate, dibutyltin acetate, dibutyltin dioctoate, and cobalt naphthenate; and various phosphorus based acidic compounds such as monoalkylphosphoric acids, dialkylphosphoric acids, monoalkylphosphorous acids dialkyl phosphorous acids.

The quantity used of such a curing catalyst is preferably within a range from 0.1 to 10 parts by weight per 100 parts by weight of the combined total of the polyester resin (A), the vinyl modified polyester resin (B) and the curing agent (C).

The pigments described above can utilize known pigments, and suitable examples include carbon black, metal oxides such as titanium oxide, magnesium oxide, zinc oxide and iron oxide, inorganic pigments such as aluminum flakes, mica, silicates, strontium chromate, zinc chromate, barium sulfate and calcium carbonate, and organic pigments such as phthalocyanine blue, phthalocyanine green, quinacridone, benzimidazolone, threne and perylene, and these may be used either singularly, or in combinations of two or more different pigments.

Furthermore, examples of the aforementioned other resins include polyether polyols, and low molecular weight polyester polyols having secondary alcohol based hydroxyl group formed from a polyol, a lactone and an acid anhydride.

The viscosity of an aqueous paint of the present invention is preferably within a range from 20 to 80 seconds when measured at a temperature of 20° C. using a Ford cup No. 4.

One example of a method of using an aqueous paint of the present invention to form a paint film with the desired high level of practical properties is a method in which an aqueous paint of the present invention is applied to the surface of a substrate that has been subjected to a surface treatment, and where necessary coated with a primer layer such as an electrodeposition film, and the applied paint is then cured under heat.

Methods such as spray methods, electrostatic methods, and electrodeposition methods can be used as the method of applying the aqueous paint of the present invention to the substrate surface, and application and curing should be conducted to produce a dried and cured paint film of the desired thickness.

The conditions for the heat curing may be set appropriately to ensure that the cross linking reaction between each of the resin components of the aqueous paint and the curing agent proceeds satisfactorily, for example, a temperature of 110 to 170° C. for a period of 15 to 40 minutes.

Furthermore, examples of substrates that can be coated with an aqueous paint of the present invention include iron or non-iron metal based metallic materials or metal products such as steel plate, stainless steel plate, chromed or plated sheets, galvanized sheets, tin plate, aluminum plate, aluminum sashes and aluminum wheels, as well as timber, slate sheets, roof tiles, and glass.

Furthermore, an aqueous paint of the present invention is particularly suitable for the intermediate coating of vehicles, and a layered paint film can be produced by applying a top coat to the surface of the paint film produced from the aqueous paint of the present invention. A composite paint film produced by applying a top coat to the surface of the intermediate coating has excellent external appearance, is unlikely to undergo paint film separation, and displays excellent resistance to chipping.

EXAMPLES

As follows is a more specific description of the present invention using a series of reference examples, examples and comparative examples.

Reference Examples 1 to 5

(Sample Preparations of Polyester Resins)

In a 3 liter 4 neck flask equipped with a stirrer, a thermometer, a reflux condenser fitted with a water trap, and a nitrogen gas inlet were placed a raw material composition as shown in Table 1 and 0.5 parts by weight of dibutyltin oxide, the temperature was raised to 220° C., and a dehydration condensation reaction was carried out. During the reaction, the acid value was measured by removing a portion of the resin solution, and the reaction was continued until the acid value of the solution produced by diluting this portion with butyl cellosolve until the non-volatile portion reached 60% by weight reached the value shown in Table 1.

Following completion of the reaction, when the reaction mixture had cooled to 150° C., where necessary a hydrophilic organic solvent shown in Table 1 was added and stirred for one hour, and subsequently, at 90° C., a basic compound shown in Table 1 was added and stirred at the same temperature for one hour. Sufficient ion exchange water was then added to reduce the non-volatile component to 40% by weight, thereby yielding an aqueous dispersion of a polyester resin (A)–1 to 5. The properties of each resin dispersion are summarized in Table 1.

TABLE 1

|  |  |  | Reference Example | | | | |
|---|---|---|---|---|---|---|---|
|  |  | Units | 1 | 2 | 3 | 4 | 5 |
| Raw materials | isophthalic acid | parts by weight | 58 | 123 | 302 |  | 317 |
|  | terephthalic acid |  |  |  |  | 369 |  |
|  | phthalic anhydride |  |  |  |  |  |  |
|  | HHPA |  | 485 | 455 | 280 |  |  |
|  | THPA |  |  |  |  | 162 |  |
|  | adipic acid |  |  |  |  |  | 280 |
|  | NPG |  | 147 | 129 | 103 | 82 | 170 |
|  | 1,6HD |  | 168 | 209 | 233 | 309 | 193 |
|  | TMP |  | 142 | 84 | 82 | 78 | 40 |
|  | Acid value of butyl cellosolve solution with non-volatile component of 60% by weight |  | 13.2 | 17.5 | 19 | 10.2 | 29.4 |
| hydrophilic organic solvent | BCS | parts by weight |  | 100 |  | 30 |  |
|  | PnP |  |  |  | 50 |  | 50 |
| basic compound | triethylamine |  | 29 |  | 41 |  |  |
|  | DMEA |  |  | 33 |  | 24 | 28 |
|  | Properties | | | | | | |
| Polyester resin | Hydroxyl value |  | 142 | 75 | 50 | 98 | 35 |
|  | Acid value of aqueous dispersion |  | 7.5 | 12.3 | 11.4 | 6.2 | 22.3 |
|  | Weight average molecular weight |  | 3700 | 6400 | 12000 | 4200 | 5000 |
|  | Name |  | (A)-1 | (A)-2 | (A)-3 | (A)-4 | (A)-5 |

HHPA: hexahydrophthalic anhydride
THPA: tetrahydrophthalic anhydride
NPG: neopentyl glycol
1,6HD: 1,6-hexanediol
TMP: trimethylolpropane
BCS: ethylene glycol-n-butyl ether
PnP: propylene glycol-n-propyl ether
DMEA: dimethylethanolamine

Reference Examples 6 to 9

(Sample Preparations of Polyester Resins having Hydroxyl Groups)

In a 3 liter 4 neck flask equipped with a stirrer, a thermometer, a reflux condenser fitted with a water trap, and a nitrogen gas inlet were placed a raw material composition as shown in Table 2 and 0.5 parts by weight of dibutyltin oxide, the temperature was raised to 220° C., and a dehydration condensation reaction was carried out. During the reaction, the acid value was measured by removing a portion of the resin solution, and the reaction was continued until the acid value of the solution produced by diluting this portion with butyl cellosolve until the non-volatile portion reached 60% by weight reached the value shown in Table 2, thereby yielding a solid polyester resin having hydroxyl groups (E)–1 to 4 that functions as a raw material for a vinyl modified polyester resin (B). The properties of each resin are summarized in Table 2.

TABLE 2

| | | Reference Example | | | |
|---|---|---|---|---|---|
| | | 6 | 7 | 8 | 9 |
| Raw materials (parts by weight) | isophthalic acid | 161 | | 277 | 190 |
| | phthalic anhydride | | 395 | | |
| | adipic acid | 330 | 39 | 244 | 42 |
| | coconut oil fatty acid | | 168 | | |
| | soybean oil fatty acid | 53 | | | 504 |
| | NPG | 101 | 17 | 22 | |
| | 1,6HD | 44 | 45 | 44 | 45 |
| | TMP | 311 | 336 | 413 | 108 |
| | PE | | | | 110 |
| Properties | | | | | |
| Polyester resin having hydroxyl groups | Hydroxyl value | 192 | 165 | 236 | 90 |
| | Acid value | 9.7 | 13.2 | 12 | 9.2 |
| | Weight average molecular weight | 9200 | 8900 | 10500 | 7500 |
| | Name | (E)-1 | (E)-2 | (E)-3 | (E)-4 |

PE: pentaerythritol

Reference Examples 10 to 12

(Sample Preparations of Vinyl Modified Fatty Acids)

In a 3 liter 4 neck flask equipped with a stirrer, a thermometer, a reflux condenser, and a nitrogen gas inlet were placed the quantities of fatty acids and xylene shown in Table 3, the temperature was raised to 130° C. with constant stirring, and a mixture of a vinyl copolymerizable monomer and a polymerization initiator was then added over a period of 3 hours. Stirring was continued at 130° C. overnight, and following subsequent cooling to 80° C., a quantity of methyl ethyl ketone shown in Table 3 was added, yielding a vinyl modified fatty acid (D)–1 to 3 with the properties shown in Table 3. The non-volatile component of the solution was 50% by weight.

TABLE 3

| | | Reference Example | | |
|---|---|---|---|---|
| | | 10 | 11 | 12 |
| Raw materials (parts by weight) | dehydrated castor oil fatty acid | | 356 | |
| | castor oil fatty acid | 356 | | |
| | tall oil fatty acid | | | 73 |
| | linseed oil fatty acid | | | 489 |
| | styrene | 172 | 110 | 117 |
| | n-butyl methacrylate | | | |
| | i-butyl methacrylate | 257 | 417 | |
| | 2-ethylhexyl methacrylate | | | 121 |
| | methacrylic acid | 215 | 117 | 200 |
| Polymerization initiator (parts by weight) | t-butylperoxy benzoate | 30 | 30 | 30 |
| Organic solvent (parts by weight) | xylene | 650 | 650 | 650 |
| | methyl ethyl ketone | 350 | 350 | 350 |
| Vinyl modified fatty acid | Acid value of solution | 98 | 69 | 115 |
| | Weight average molecular weight | 6400 | 7000 | 6500 |
| | Name | (D)-1 | (D)-2 | (D)-3 |

Reference Examples 13 to 16

(Sample Preparations of Vinyl Modified Polyester Resins)

In a 3 liter 4 neck flask equipped with a stirrer, a thermometer, a reflux condenser fitted with a water trap, and a nitrogen gas inlet was placed a raw material composition shown in Table 4, the temperature was gradually raised to 180° C., the xylene and methyl ethyl ketone were boiled off and a dehydration condensation was carried out. The reaction was continued until the acid value of the resin solution produced by diluting the reaction mixture with butyl cellosolve until the non-volatile portion reached 50% by weight reached the value shown in Table 4. Following completion of the reaction, when the reaction mixture had cooled to 150° C., where necessary a hydrophilic organic solvent shown in Table 4 was added and stirred for one hour, and subsequently, at 90° C., a basic compound shown in Table 4 was added and stirred at the same temperature for one hour. Sufficient ion exchange water was then added to reduce the non-volatile component to 40% by weight, thereby yielding an aqueous dispersion of a vinyl modified polyester resin (B)–1 to 4. The properties of each resin dispersion are summarized in Table 4.

TABLE 4

| | | | Reference Example | | | |
|---|---|---|---|---|---|---|
| | | Units | 13 | 14 | 15 | 16 |
| Raw materials | (E)-1 | parts by weight | 760 | | | |
| | (E)-2 | | | | 600 | |
| | (E)-3 | | | 500 | | |
| | (E)-4 | | | | | 650 |

TABLE 4-continued

|  |  | Units | Reference Example | | | |
|---|---|---|---|---|---|---|
|  |  |  | 13 | 14 | 15 | 16 |
|  | (D)-1 |  | 240 |  |  |  |
|  | (D)-2 |  |  | 500 |  | 350 |
|  | (D)-3 |  |  |  | 400 |  |
|  | Acid value of butyl cellosolve solution with non-volatile component of 50% by weight |  | 6.5 | 19.0 | 25.0 | 14.8 |
| hydrophilic organic solvent | BCS PnP | parts by weight |  | 50 | 100 | 10 |
| basic compound | triethylamine DMEA |  | 48 | 23 | 104 | 23 |
|  | Properties |  |  |  |  |  |
| Vinyl modified polyester resin | Hydroxyl value |  | 38 | 80 | 55 | 40 |
|  | Acid value of aqueous dispersion |  | 13.0 | 15.2 | 21.3 | 10.7 |
|  | Weight average molecular weight |  | 57000 | 100000 | 63000 | 51000 |
|  | Name |  | (B)-1 | (B)-2 | (B)-3 | (B)-4 |

Examples 1 to 5,

Comparative Examples 1 to 3

In a stainless steel vessel were placed a predetermined quantity of a vinyl modified polyester resin (B)–1 to 4, a predetermined quantity of titanium oxide R-930 or titanium oxide CR-97, and an equal quantity of glass beads as shown in Table 5, a quantity of an antifoaming agent BYK-080 equivalent to 0.5% by weight relative to the combined total of the vinyl modified polyester resin and the titanium oxide was added, and the mixture was dispersed for two hours using a paint shaker.

Subsequently, predetermined quantities of a polyester resin (A)–1 to 5 and a curing agent shown in Table 5 were added, the mixture was stirred for 5 minutes, the glass beads were removed, and the viscosity was adjusted by adding ion exchange water to produce a Ford cup No. 4 viscosity of 50 seconds (20° C.), thereby yielding an aqueous paint each. The viscosity of each aqueous paint was measured immediately following production, and then again after storage for 10 days at 40° C., and the variation in viscosity is shown in Table 6. Furthermore, the non-volatile component of each aqueous paint is also shown in Table 6.

TABLE 5

| Units | Example No. | | | | | Comparative Example No. | | |
|---|---|---|---|---|---|---|---|---|
| (parts by weight) | 1 | 2 | 3 | 4 | 5 | 1 | 2 | 3 |
| Polyester resin | | | | | | | | |
| (A)-1 | 123 |  |  | 140 |  |  |  |  |
| (A)-2 |  | 75 |  |  |  |  | 150 |  |
| (A)-3 |  |  | 150 |  |  |  |  |  |
| (A)-4 |  |  |  |  | 123 | 140 |  |  |
| (A)-5 |  |  |  |  |  |  |  |  |
| Vinyl modified polyester resin | | | | | | | | |
| (B)-1 | 53 |  |  |  |  | 60 |  |  |
| (B)-2 |  |  | 63 | 35 |  |  |  |  |
| (B)-3 |  | 75 |  |  |  |  |  | 150 |
| (B)-4 |  |  |  |  | 53 |  |  |  |

TABLE 5-continued

| Units | Example No. | | | | | Comparative Example No. | | |
|---|---|---|---|---|---|---|---|---|
| (parts by weight) | 1 | 2 | 3 | 4 | 5 | 1 | 2 | 3 |
| Curing agent | | | | | | | | |
| C-370 | 34 |  | 17 | 34 | 34 |  |  |  |
| S-695 |  | 61 |  |  |  | 30 | 61 | 61 |
| Titanium oxide | | | | | | | | |
| R-930 | 67 | 82 |  |  |  | 67 | 82 | 82 |
| CR-97 |  |  | 67 | 67 | 82 |  |  |  |

C-370: Cymel C-370 (a partially etherified methylol melamine resin manufactured by Mitsui Cytec Ltd., non-volatile component: 88% by weight)
S-695: SUPER BECKAMINE S-695 (a melamine resin, manufactured by Dainippon Ink and Chemicals Inc., non-volatile component: 66% by weight)
BN-69: ELASTRON BN-69 (a water dispersed block isocyanate, manufactured by Dai-ichi Kogyo Seiyaku Co., Ltd., non-volatile component: 40% by weight)
R-930: TIPAQUE R-930 (titanium oxide, manufactured by Ishihara Sangyo Kaisha, Ltd.)
CR-97: TIPAQUE CR-97 (titanium oxide, manufactured by Ishihara Sangyo Kaisha, Ltd.)

Reference Example 21

(Preparation of an Intermediate Coated Sheet)

The aqueous paints obtained in the examples 1 to 5 and the comparative examples 1 to 3 were each sprayed onto an electrodeposition sheet (manufactured by Nippon Route Service Company Co., Ltd.) in sufficient quantity to generate a dried paint film with a thickness of approx 35 μm, and the coating was then left to stand for 10 minutes at room temperature, and dried by heating for 10 minutes at 60° C. Subsequently, the coating was baked for 30 minutes at 140° C., yielding an intermediated coated sheet. Using these intermediate coated sheets, the intermediate coating performance tests shown in Table 6, namely, gloss, hardness and xylene rubbing tests were carried out.

Reference Example 22

(Preparation of a Base Coat Paint)

A mixture with the composition described below was diluted with a diluting solvent comprising a mixture of toluene and ethyl acetate in a weight ratio of 9/1, until the viscosity using a Ford cup No. 4 was from 12 to 13 seconds, thereby yielding a base coat paint.
ACRYDIC A-322 (an acrylic resin, manufactured by Dainippon Ink and Chemicals Inc.); 160 parts by weight
SUPER BECKAMINE L-117-60 (a butylated melamine resin, manufactured by Dainippon Ink and Chemicals Inc.); 33 parts by weight
ALPASTE 1860YL (an aluminum paste, manufactured by Toyo Aluminum Co., K. K.); 23 parts by weight
FASTOGEN Blue NK (a phthalocyanine based organic pigment, manufactured by Dainippon Ink and Chemicals Inc.); 2 parts by weight

Reference Example 23

Preparation of a Clear Coat Paint

A mixture with the composition described below was diluted with a diluting solvent comprising a mixture of xylene and 1-butanol in a weight ratio of 8/2, until the viscosity using a Ford cup No. 4 was from 22 to 24 seconds, thereby yielding a clear coat paint.
ACRYDIC A-345 (an acrylic resin, manufactured by Dainippon Ink and Chemicals Inc.); 127 parts by weight
SUPER BECKAMINE L-117-60 (a butylated melamine resin, manufactured by Dainippon Ink and Chemicals Inc.); 50 parts by weight
TINUVIN 900 (a benzotriazole based ultraviolet absorption agent, manufactured by Ciba-Geigy Co., Ltd.); 3 parts by weight
SANOL LS-765 (a hindered amine based light stabilizer, manufactured by Sankyo Co., Ltd.); 1 part by weight
KP-321 (a leveling agent, manufactured by Shin-Etsu Chemical Ltd.); 0.05 parts by weight

Reference Example 24

Preparation and Evaluation of Top Coated Sheets

The base coat paint prepared in the reference example 22 was sprayed onto each of the intermediate coated sheets produced in the reference example 21 in sufficient quantity to generate a dried paint film with a thickness of approx 15 μm, the coating was left to stand for 3 minutes at room temperature, and the clear coat paint prepared in the reference example 23 was then sprayed onto each sheet in sufficient quantity to generate a dried paint film with a thickness of approx 35 μm. Each sheet was subsequently left to stand for 10 minutes at room temperature, and was then baked for 30 minutes at 140° C. to produce a top coated sheet with a composite paint film.

Visual examination of the external appearance of each top coated sheet showed that all of the top coated sheets displayed a superior appearance with no problems such as gloss deterioration or the like. Furthermore, when chipping resistance tests were conducted using the top coated sheets, each top coated sheet displayed excellent resistance to chipping. The results are shown in Table 6.

TABLE 6

| | Example No. | | | | | Comparative Example No. | | |
|---|---|---|---|---|---|---|---|---|
| | 1 | 2 | 3 | 4 | 5 | 1 | 2 | 3 |
| Viscosity variation of aqueous paint (seconds) | −3 | 0 | 0 | +3 | −6 | +20 | *precipitation | +3 |
| Non-volatile component of paint (% by weight) | 57 | 62 | 59 | 63 | 58 | 60 | 65 | 50 |
| Intermediate coating performance | | | | | | | | |
| Gloss (60°) | 96 | 90 | 92 | 89 | 90 | 93 | 90 | 93 |
| Hardness | F | H | HB | F | HB | HB | F | H |
| Xylene rubbing | A | A | A | A | A | A | A | A |
| Composite paint film performance | | | | | | | | |
| Chipping resistance | B | A | A | A | B | D | A | D |

*Pigment precipitation was observed.

Viscosity Variation of Aqueous Paints: Sufficient ion exchange water was added to the aqueous paint to produce a Ford cup No. 4 viscosity of 50 seconds (20° C.), and the aqueous paint was then stored for 10 days at 40° C. The viscosity of the aqueous paint following storage was measured using a Ford cup No. 4, and the variation in the viscosity value relative to the viscosity prior to storage was determined.

Procedure for Evaluating Physical Properties of the Aqueous Paints

Gloss: The 60 degree gloss value (the 60 degree specular reflectance: %) was measured using a Handy Gloss Meter manufactured by Suga Test Instruments Co., Ltd.

Hardness: Hardness tests were conducted in accordance with the pencil scratch test of JIS K 5400, and the hardness symbol of the hardest pencil for which no scratching of the paint film occurred was recorded.

Xylene Rubbing: A flannel cloth was immersed in xylene, the cloth was rubbed 50 times back and forth across the paint film using a rubbing tester, and the state of the paint surface was inspected visually, and evaluated in the manner described below.
A: No swelling or scratches
B: Slight scratching, with fine scratches visible
D: Marked swelling, and scratches visible Chipping Resistance: Using a Gravelometer manufactured by Suga Test Instruments Co., Ltd., in an atmosphere at −20° C., 50 g of No. 7 gravel was ejected at 0.4 MPa, and the degree of paint film separation upon collision with the surface of the paint film was evaluated visually in the manner described below.
A: Excellent (absolutely no separation)
B: Good (very slight separation observed)
C: Fair (some separation visible)
D: Poor (separation noticeable)

What is claimed is:

1. An aqueous resin composition comprising a polyester resin (A) having an acid value within a range from 10 to 50 and a hydroxyl value within a range from 20 to 150, a vinyl modified polyester resin (B) having an acid value within a range from 20 to 100 and a hydroxyl value within a range from 20 to 150, and a curing agent (C), wherein
   said polyester resin (A) comprises structural units provided by an aromatic acid and from an alicyclic acid, and a combined total of said structural units provided by said aromatic acid and said alicyclic acid accounts for at least 70 mol % of all structural units provided by polybasic acids in said polyester resin (A), and said vinyl modified polyester resin (B) comprises an aliphatic acid chain having a bonded vinyl polymer section, in which from 15 to 45% by weight of said vinyl modified polyester resin (B) is said vinyl polymer section, and from 10 to 50% by weight of said vinyl polymer section is structural units provided by an $\alpha,\beta$-ethylene based unsaturated monomer having a carboxyl group wherein said vinyl modified polyester resin (B) is produced by condensing a vinyl modified fatty acid (D) containing a vinyl polymer section comprising a carboxyl group, and a polyester resin (E) containing hydroxyl groups.

2. An aqueous resin composition according to claim 1, wherein said vinyl modified polyester resin (B) is produced by condensing a vinyl modified fatty acid (D) containing a vinyl polymer section comprising a carboxyl group and an aryl group, and a polyester resin (E) containing hydroxyl groups.

3. An aqueous resin composition according to claim 1, wherein a molar ratio within said polyester resin (A) between structural units derived from an aromatic acid and structural units derived from an alicyclic acid is within a range from 20/80 to 50/50.

4. An aqueous paint comprising an aqueous resin composition according to claim 1.

* * * * *